United States Patent [19]

Charbonnier

[11] Patent Number: 5,471,317
[45] Date of Patent: Nov. 28, 1995

[54] VIDEOTEX FACSIMILE MACHINE

[75] Inventor: Philippe Charbonnier, Yvelines, France

[73] Assignee: Societe d'Applications Generales d'Electricite et de Mecanique Sagem, Paris, France

[21] Appl. No.: 1,715

[22] Filed: Jan. 7, 1993

[30] Foreign Application Priority Data

Jan. 14, 1992 [FR] France .................................. 92 00299

[51] Int. Cl.⁶ ............................. H04N 1/00; H04M 11/00
[52] U.S. Cl. .......................... 358/400; 358/434; 379/100
[58] Field of Search ...................................... 358/400, 434, 358/435, 436, 438, 439, 442; 379/100, 90, 93, 96; 375/8

[56] References Cited

U.S. PATENT DOCUMENTS 5,060,257  10/1991  Penalver ................................ 379/100
5,164,982  11/1992  Davis ...................................... 379/96

Primary Examiner—Edward L. Coles, Sr.
Assistant Examiner—Thomas D. Lee
Attorney, Agent, or Firm—Lowe, Price, LeBlanc & Becker

[57] ABSTRACT

The facsimile machine comprises a processor 10, a modem 18, a switch 20 connecting to a data transmission line 8, means for connecting to at least one main telephone set 7, switches 6, 61 connecting the telephone set 7 to the data transmission line 8, a module 17 recognizing the nature of the incoming calls, and a printer 14. The modem 18 is a combined modem of fax and videotex. Means 10 are provided so that in case of connection between videotex modem part 18 and the data transmission line 8, the events on line 8 shall be detected and their nature recognized, and thus the line 8 shall be routed onto the facsimile modem part or the videotex modem part 18 as a function of the nature of these events.

1 Claim, 3 Drawing Sheets

VIDEOTEX FACSIMILE MACHINE

TECHNICAL FIELD

The present invention concerns a facsimile machine comprising a processor, a modem, linkage means to a data-transmission line, linkage means to at least one main telephone set, means linking the telephone set to the data-transmission line, a module recognizing the kind of incoming calls and a printer.

BACKGROUND ART

Presently the facsimile machines are part of conventional office equipment are essential. Moreover they are increasingly used in households. Besides such facsimile machines, their users also have access to other equipment such as videotex terminals.

The above conventional facsimile machines comprise means to recognize the kind of incoming calls whereby, in combination with other means, they are able to discriminate between facsimile communications and telephone communications and to route the data-transmission line, which a priori is a telephone line, either onto the facsimile components, among which the modem, or onto the telephone set. These facsimile machines also are equipped with a printer which besides other functions allows them, when in the "local copy" mode, to act as a photocopier.

The modem of these conventional facsimile machines is the V.21/V.27ter/V.29 type of the corresponding CCITT recommendations.

Conventional videotex terminals, for instance of the Minitel type, are designed to receive the "screens" from a server center and to display them. For that purpose they comprise in particular a processor, a modem, linkage means to a telephone set, a keyboard and a screen.

The modem of these conventional videotex terminals is the V.23 type of the corresponding CCITT recommendation.

DISCLOSURE OF THE INVENTION

In the light of the two above cited features of facsimile machines, the applicant conceived the functional combination of the above equipment with videotex terminals so that the same shall benefit from some of the means of these facsimile machines, and vice-versa.

The present invention concerns an above defined kind of facsimile machine which is characterized in that the modem is a combined fax and videotex modem and in that means are provided which, in the case of the data-transmission line being linked to the videotex part of the modem, shall detect events on the line and hence recognize their nature and thereby route the line onto the facsimile modem or the videotex modem as a function of the kind of events.

The expression "events" means for instance transmissions of data or of frequency signals.

In a first embodiment mode of the facsimile machine, the data-transmission line is a telephone line, and the links connect the telephone line either to a videotex terminal or to the facsimile machine modem, or to both.

Accordingly the invention concerns also associating the facsimile machine—in this first embodiment mode— with a videotex terminal connected between the facsimile machine and the main telephone set without using the port of the videotex terminal.

In this instance the videotex terminal splits the telephone line between the facsimile machine and the telephone set, the facsimile machine printer acting as a videotex terminal.

In a second embodiment mode, the facsimile machine of the invention comprises a keyboard and a screen.

In this latter instance, the videotex function is totally integrated into the facsimile machine. The data-transmission line may be a line of the switched telephone network STN or it may be line of an integrated services digital network ISDN.

In a third embodiment mode, the facsimile machine of the invention includes means for direct connection to a non-videotex terminal and means for linking the non-videotex terminal to the data-transmission line of one of the two STN and ISDN networks, and recording, detecting and routing means are designed so that in the case of linkage between the line and the non-videotex terminal, the line shall be routed to the facsimile machine or to the non-videotex terminal.

The non-videotex terminal may be a recording answering machine.

In this latter instance, the facsimile machine may be designed in such manner that when there is an incoming call, it shall accept the telephone line only after a number of rings higher than that after which the recording answering machine links its read-record means to the line.

Advantageously the facsimile machine shall comprise means for direct connection to several terminals.

The facsimile machine may be designed to be isolated from the line and to isolate this line from a recording answering machine.

Again, the facsimile machine in association with a telephone set and a recording answering machine linked to the line may route, if so designed, the line to the telephone set and isolate the recording answering machine.

BRIEF DESCRIPTION OF DRAWINGS

The invention is elucidated by the following description of several embodiment modes of the facsimile machine of the invention and in relation to the attached drawing.

BEST MODE FOR CARRYING OUT THE INVENTION

Figure 1:
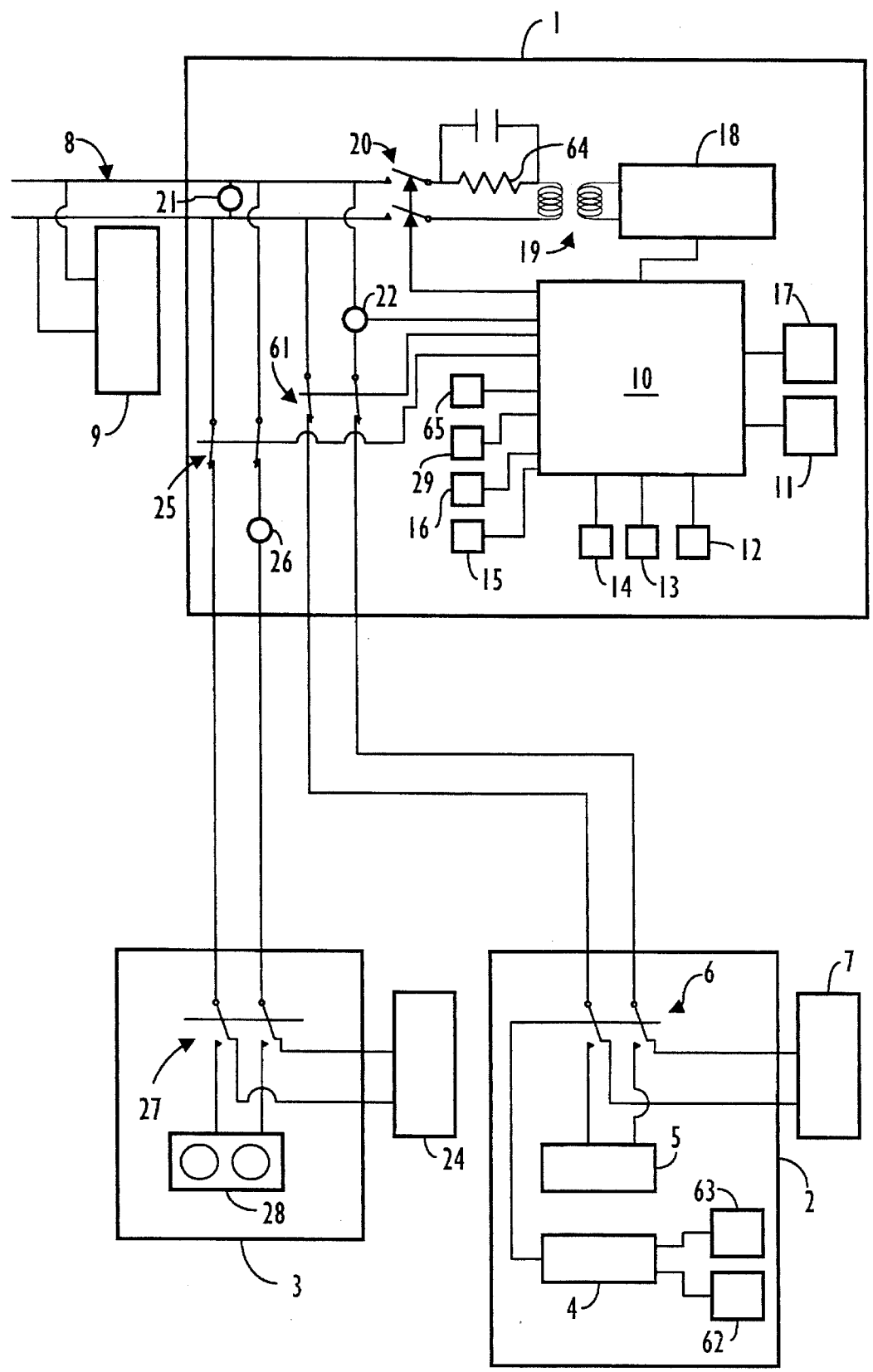
FIG. 1 is a functional block diagram of a first embodiment of the facsimile machine associated with a videotex terminal, further with a recording answering machine and a parallel secondary telephone set, (i.e., an extension)

As regards FIG. 1, a facsimile machine 1 of the invention in this instance is associated with three terminals, namely a videotex terminal 2 which here is a Minitel type well known to one of ordinary skill in the art and commonplace in France. The embodiment shown here is a common version without an optical printer. Also shown is a recording answering machine 3 which is just as conventional and widespread as the terminal 2, and a parallel secondary telephone set 9. The terminal 2 is set up to receive "screens" from a server center and to display them for the sake of clarity. FIG. 1 omits the following components from the terminal 2: its processor 4, its modem 5, its screen 62, its keyboard 63 and a switch 6 linking the facsimile machine 1 to a main telephone set 7 or to the videotex terminal 2.

The facsimile machine 1 is accordingly linked to a telephone line 8 of the STN network and through the terminal 2 to the main telephone set 7. The telephone extension 9 branched on line 8 conventionally "upstream" of the facsimile machine 1 shares the line with the facsimile machine 1 and the associated main telephone set 7.

The facsimile machine 1 comprises a central processor 10 linked to a storage means 11, an analysis module or scanner 12, a character generator 13, a printer 14, a "start" key 15, a "stop" key 16, manual-response/automatic-response switch 29, a programmable filter module 17 to recognize the nature of the incoming calls to implement routing between telephone and faxing and, more generally, to discriminate between the incoming calls, further a modem 18 connected to the terminals of the secondary winding of a transformer 19, and other conventional components of a facsimile machine that are not required to understand the invention and therefore are omitted. Modem 18 is a combined modem of fax and videotex and therefore comprising in this instance the V.23 functions of a videotex-terminal modem and the V.21/V.27ter/V.29 functions of a conventional facsimile-machine modem.

The recognition module 17 is designed to recognize the 1,100 Hz frequency of the auto-dial facsimile machines, further the 1,300 Hz frequency (permanent or chopped) of the auto-call videotex servers as well as the absence of voice signals. The telephone line 8 enters the facsimile machine 1 and can be routed through a switch 20 controlled from the processor 10 toward the modem 18, or, through a switch 61 also controlled by the processor 10, toward the terminal 2 and the associated set 7. A call display, or ring detector 21, is connected in parallel to the line 8 "upstream" of the switch 20, and a current sensor 22, which may be in series with the terminal 2 and the set 7 and is located between the sensor 21 and the switch 61, allows determining whether the set 7 is on line or at rest.

The recording answering machine 3 which in this case too is associated with a telephone set 24 may be branched onto the line 8 "upstream" of the switch 20, and in this case, downstream of the sensor 21, by means of a switch 25 and of a second current sensor 26 between the switch 25 and the recording answering machine 3. A switch 27 in the recording answering machine 3 allows linking the line either to a record-read component 28 which is symbolically shown in FIG. 1 by a cassette for the sake of simplicity, or to the telephone set 24.

The normal position of switch 20 is that shown in FIG. 1 wherein the line 8 is isolated from the modem 18 of the facsimile machine and is connected through switch 61 to the terminal 2, the switch 25 being in the position shown in FIG. 1 wherein the line 8 is linked to the recording answering machine 3.

The facsimile machine 1 is designed to discriminate between the incoming calls.

When the user of the facsimile machine 1 actuates the reversing switch 29, he throws 30 the facsimile machine 1 into the manual response mode to isolate it: the switch 20 remains in its normal position and the switch 25 is actuated to isolate the answering machine 3 too. In this state neither the facsimile machine 1 nor the answering machine 3 can answer the incoming calls. Be it borne in mind that the recording answering machines are equipped with a switchover control for manual-answer/automatic-answer. In this case however the switchover controls for the two machines 1 and 3 are advantageously combined into a single one in the facsimile machine. Again in this state the central telephone set 7 and the extension 9 may be used in wholly conventional manner.

Figure 2:
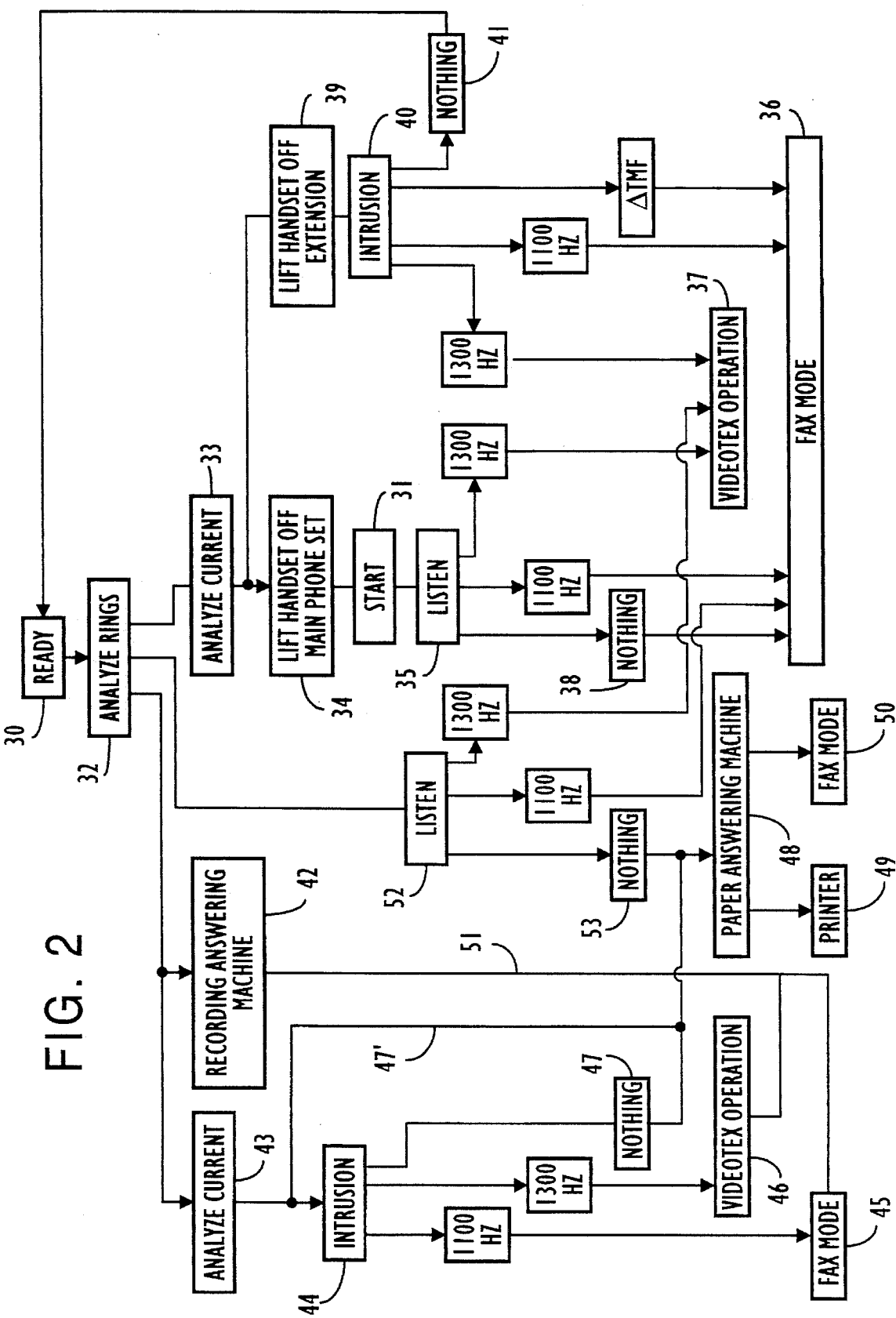
FIG. 2 is a flow chart of the operation of the facsimile machine of FIG. 1.

As regards the flowchart of FIG. 2, in the event the incoming call is other than a telephone call, or non-voice, and if the user has taken off the handset of the main telephone set 7, he will drive 31 the "start" key 15, whereby the switch 20 moves into the operative position connecting the line 8 to the modem 18. Previously, on account of the ring analysis 32 by the sensor 21 and the current analysis 33 by the sensor 22, the lifting of the handset of the main telephone set 7 was detected 34 by the facsimile machine (processor 10). For several moments the facsimile machine listens 35, in this instance for 5 seconds, and determines the nature of the call. The call may be from an automated dialing facsimile machine or front an auto-call videotex server.

The 1,100 Hz frequency having been detected in the former case by the recognition module 17, the processor 10 is set up so that the facsimile machine proceed in the fax mode 36: the switch 20 remains in the operational position and the standard protocol T30 controlling exchanges between facsimile machines is initiated.

In the latter case, with the 1,300 Hz frequency having been detected by the module 17, the facsimile machine 1 by means of the V.23 function of the modem 18 tries to recognize a videotex application it can process without keyboard or screen, as for the above faxing.

If successful, the facsimile machine 1 proceeds in that manner and, to use terms similar to faxing and telephone operation, in a mode that herein may be coined to be "videotex operation" 37.

If unsuccessful, the facsimile machine abandons its efforts and lets go of the switch 20 which returns to its normal position. Actually such abandonment is no serious matter because in the case under consideration, the user is present and those applications requiring a keyboard or a screen are those created by user-initiated calls, not the reverse.

In a third case 38, no particular frequency is being detected as the 5 seconds elapse and accordingly the facsimile machine proceeds in the telephone mode 36.

If the incoming call is non-voice and the user has taken off 39 the handset of the extension 9, then, on account of the ring analysis 32 (the rings vanish) and the current analysis 13 (sensor 22 remains unenergized), the lifting of handset of the extension 9 was sensed by the processor 10 of the facsimile machine. By throwing the switch 20 into the operative position, the facsimile machine moves into parallel intrusion 40 to listen to the signals from the extension 9 of which it then determines the nature. These may be telematic signals and dual-tone multifrequency DTMF remote control signals transmitted by the user from a key at the extension 9 and recognized by the filters of the recognition module 17.

Thereupon the user need only hang up the handset of the extension 9 so that the facsimile machine may proceed in the recognized application.

In the event the 1,100 HZ frequency is detected, the facsimile machine goes on in the fax mode 36; if a 1,300 Hz frequency is detected, it proceeds in videotex operation 37, however only for those applications it knows how to process; in the event of a DTMF signal, the facsimile machine may proceed in the fax mode 36. If none of the above signals was detected 41 at the end of illustratively 15 seconds, the switch 20 is thrown into the normal position 30 in the case being considered, the facsimile machine concluding that the extension 9 remains on line in voice conversation.

So far the facsimile functions ensuring discrimination between voice, fax or telematic signals have been considered.

When the user of the facsimile machine 1 is absent, he uses the reversing switch 29 to move the facsimile machine into the automatic response mode as a result of which the switch 25 is in its normal position and thus linked to the recording answering machine 3—the switches 20, 61 and 62 also being in the normal positions 30.

The conventional recording answering machine 3 comprises an omitted call detector which, when after m rings the user has not lifted the handset, allows throwing the switch 27 into connection with the read-record component 28.

When put in operation, the facsimile machine 1 is adjusted so that it shall only accept calls after n rings, with n being larger than m. Once the recording answering machine 3 is in operation and when, after m rings, in the presence of a conventional message, it accepts the incoming call 42 as detected by the processor 10 of the facsimile machine 1 by means of a number of rings 32 less than n and by the activation 43 of the current sensor 26, the facsimile machine 1 moves into parallel intrusion 44 by the switch 20 being thrown into its operative position wherein it listens to the signals of the recording answering machine 3.

If a voice message is present, it shall be entered 42 on the recording means 28 of the recording answering machine 3.

In case a 1,100 Hz frequency is detected, the facsimile machine proceeds in the fax mode 45, the switch 20 remaining in the operative position; in the event a 1,300 Hz frequency is detected, it continues in the videotex mode 46 without the switch 20 being reversed into its normal position. In both instances the facsimile processor 10 reverses the switch 25 into the operative position to isolate 51 the recording answering machine 3 which by itself shall return shortly thereafter into its wait position. When the caller fails to emit any voice message 47 or if a voice message was recorded by the recording answering machine 3 that did hang up and of which the sequence did end 47', this condition will be sensed by the facsimile machine after a period of silence in this case of about 8 seconds or by release of detector 26, and the facsimile machine may attempt 48 an operational mode called "paper answerer".

By means of its V.23 videotex function, the modem 18 receives normally the server information at high speed (1,200 bauds) while transmitting its own at low speed (75 bauds). The processor 10 of the facsimile machine 1 is designed to reverse the receiving and transmitting speeds of the modem 18: in the "opposite mode", the transmission of information by the modem 18 is at high speed and the receiving of information is at low speed.

The carrier frequency of the fast channel of the modem 18 in this instance is 1,300 Hz and that of the slow channel is 390 Hz. The above mentioned T 30 protocol in particular defines standardized frames and especially a digital identification signal DIS frame allowing the called facsimile machine to announce its standard performance (modem features, coding, speed, format, ability to be read out by another remote machine . . . ). Accordingly when the attempt is made to be in the "paper answering machine" mode, the processor 10 commands its modem 18 to assume the "opposite mode" and waits for the return carrier which therefore is at 390 Hz.

In the event this return carrier is received within a time interval which in this illustration is 12 seconds, a videotex connection is set up and the facsimile machine asks the caller to type his message. This message is recorded 49 on the printer 14 of the facsimile machine 1, which explains the term "paper answering machine" for this application. If the return carrier does not "converge" after the said time interval, the facsimile machine undertakes 50 a last attempt to implement the fax mode, leaving the switch 20 in the operative position and transmitting DIS frames in this instance for 35 seconds.

The paper answering machine mode 48 is optional and when the caller leaves no voice message 47, the facsimile machine immediately undertakes a last fax mode attempt. Accordingly an opportunity is given to all applications, including, in the end, to faxing in the manual mode in the absence of the 1,100 Hz frequency of the automatic-dialing facsimile machines. The first opportunity was provided to the recording answering machine 3, the second and third to receiving a message from a message from an auto-dial facsimile machine (1,100 Hz) or from a videotex server (1,300 Hz), the fourth to the paper answering machine and the fifth to receiving a manual-mode facsimile machine message.

As regards operation and still for the case of a running recording answering machine accepting an incoming call after m rings, the acceptance message of the recording answering machine 3 asks the caller to leave a spoken message, a fax, by initiating his facsimile machine or a videotex message by pushing the connection key of his terminal.

In case of a spoken message recorded on the answering machine 3, once the caller has hung up and without his knowing it, attempts at faxing and of paper answering machines shall be carried out.

Once the acceptance message has been completed and if the caller has a videotex terminal, he may push the connection key of his terminal to seek the 1,300 Hz carrier frequency, as a result of which the 8-second silence interval is generated, whereupon the facsimile machine 1 initiates the paper answering machine mode.

If the caller is a facsimile machine user, he initiates his facsimile machine in the fax mode that shall be delayed by the attempt of the called facsimile machine 1 to reply in the paper answering machine mode, but that shall nevertheless be carried out ahead of time of its facsimile machine's watchdog which is a standard delay.

As regards automated calls which are characterized by a 1,100 or 1,300 Hz frequency, they are immediately detected by the recognition module 17, the facsimile machine 1 being in parallel intrusion, and they are accordingly routed.

If n rings took place without reaction, either there is no answering machine or if there is one, it is unavailable or shut off. In the latter case, the facsimile machine 1 takes the call by the switch 20 being thrown into the operative position and said machine listening 52 silently for 5 seconds in this case. If a 1,100 Hz frequency is detected, the facsimile machine proceeds in the fax mode 36; if a frequency of 1,300 Hz is detected, it proceeds in the videotex mode 37 always for the applications it is designed to process. If after 5 seconds no signal was detected 53, the facsimile machine 1 attempts the paper answering mode 48 as for the case of an acceptance message being emitted by the recording answering machine 3.

When, even though the apparatus be in the automatic response mode, the user comes home and lifts the handset before the recording answering machine or the facsimile have acted equivalently (m or n rings), the facsimile machine 1 will behave as if in the manual mode. If the call is other than through the telephone and the user has picked up the handset of the main telephone set 7, he can engage in a "handshake" by pushing the start key 15. If he picked up the handset of the extension 9, he can pass the handshake to the facsimile machine 1 by transmitting the telematic signals or by pushing the DTMF remote control key and then hanging up.

As a rule commercial recording answering machines allow listening to the loudspeaker and enable the user to take up communications on the associated set (24), this communication resumption being detected by the apparatus and causing its return to rest. The above described facsimile machine also comprises this feature; however the associated set 24 may be eliminated. For that purpose the communication may be resumed on the main set 7 while pushing the stop key 16 of the facsimile machine 1. Thereupon said machine departs from its parallel intrusion mode, the switch 20 being thrown into its normal position and the current detector 22 being activated, and during the communication time, actuation of the switch 25 to isolate the recording answering machine 3 which returns to rest.

The parallel intrusions 40 and 44 were described as the facsimile machine being connected through activation of the switch 20 to the line. While this is feasible, it does incur a slight drawback in that the voice signals will be somewhat attenuated and that part of the line current will be drained. This drawback is circumvented by high-impedance intrusion; it may be illustratively implemented in that for the states 40 and 44, not only shall the switch 20 be actuated, but also two others, which are omitted, one of which breaks the line current by cutting open the resistance path 64 between the transformer 19 and the switch 20, the other switching the matching resistance of modem 18 from the normal to a high value.

Regarding the outgoing calls, each of the associated apparatus may at will occupy line 8 if it is free. The videotex terminal 2 may acquire said line through the telephone set 7 and an omitted connection key at the terminal to throw the switch 6, except for the case of the facsimile machine 1 being on line, the switches 20 and 61 being in the operative position. If the detectors 22, 26 have been activated, the facsimile machine 1 will refrain from automated calls. When the facsimile machine 1 attempts an outgoing call, it makes sure there is the request tone for dialing, and, in the absence of this tone, will quickly "hang up", illustratively the extension 9 being on line. The set 24, which in this case is associated with the recording answering machine 3, may occupy the line if the facsimile machine 1 did not; in case there is recording, as a rule there follows a stop of the record-read function 28. The (parallel) extension 9 may be on line anytime, however the user will have to detect on his own an on-going transmission of data in order to hang up rapidly.

A number of conditions were described above for paper answering machine applications closely related to a subsequent faxing attempt. Obviously there are a number of deductive configurations, wherein:

either the paper answering machine is not provided, and a faxing attempt would immediately ensue, or faxing is not available at this stage.

The paper answering machine will now be described in greater detail.

The facsimile machine 1 and the videotex terminal 2 of FIG. 1 are assumed. When the user is absent and an incoming call is on line 8, the facsimile machine 1 accepts it and determines whether it is for an application it knows how to recognize. If not, the incoming call having been transmitted from a videotex terminal, the facsimile machine 1 attempts the mode of paper answering machine.

The processor 10 acts as a server by transmitting an acceptance screen on line. The calling user, who detects the carrier of the fast channel of the modem 18, links his suitable videotex terminal, then receives the acceptance screen of the facsimile machine 1 which asks him to type a message on the keyboard of his videotex terminal. The facsimile machine 1 receives this message. Thanks to the character generator 13 delivering an image of that message, this message is printed by the printer 14 of the facsimile machine 1. In this application, the facsimile machine acts as a telematic recording answering machine which the user, upon coming home, may directly consult without any handling.

Consider the case when the user is in videotex connection through the videotex terminal 2 linked to the line 8, that is, after having called a server from the set 7 and having connected the videotex terminal 2. The facsimile machine senses this connection through the current sensor 22. Thereupon the facsimile machine 1 by itself links up in parallel intrusion with the preferably high-impedance terminal 2 by throwing only the switch 20 into the operative position, the switch 61 remaining in the normal, i.e. closed position. Using the functional part V.23 of its modem 18, the facsimile machine monitors the ongoing communication of the terminal 2. All the data displayed on the screen 62 of the terminal 2 are picked up and stored, screen by screen, by the facsimile machine 1, said screens being thereafter erased by storage overwrite. If the user wants to print a screen, he pushes a "print" key 65 on the facsimile machine 1 which, following decoding, prints the last received screen, the communication from the videotex terminal continuing normally.

If the facsimile machine 1 detects a protocol element "DC printer" or "DC fax" defined by the instructions for use of the Minitel network (IUMN), then a server wants to initiate a conventional videotex teleprint or a teleprint of a fax document coded in videotex. In that case the facsimile machine 1 throws the switch 61 into its operative position in order to isolate the terminal 2 from the line 8 and in order to manage by itself the communication till its end. If it was in high impedance, it will pass to low impedance. The facsimile machine 1 puts on the line the acknowledgment "AC printer" or "AC fax" and assumes the protocols corresponding to either of the two applications till the end of communication by directly printing the documents sent by the server.

The above described facsimile machine is a multifunctional machine, of which the modem also is multifunctional (fax and videotex operations) and is linked to a telephone line of the STN network and is associated with a videotex terminal.

Another multifunctional facsimile machine 1' shall now be described in relation to FIG. 3, which also comprises a multifunctional modem and which is linked to a telephone line of the STN network, but which comprises an integrated videotex terminal. To simplify and make the matter easier to understand, the same components will be denoted by the same references.

Just as the facsimile machine 1, the facsimile machine 1' is linked to the line 8 and in particular comprises the ring sensor 21, the switch 20 linking line 8 either to the modem 18 or to the telephone set 7, further the current sensor 22, the current sensor 26 and the switch 25 for an external recording answering machine which shall be connected to the terminals 68, the processor 10, the modem 18, the scanner 12, the printer 14, furthermore the screen 62 and the keyboard 61.

Moreover, a switch 67 is present between the switch 20 and the transformer 19 of the modem 18 to allow connecting any integrated recording answering machine (omitted) to the line, further a switch 66 is provided between the switch 20 and the current sensor 22 to allow connecting any integrated recording answering machine (omitted) to the line.

First the case of an external recording answering machine hooked up to terminals 68 will be discussed.

The facsimile machine 1' operates nearly identically as the facsimile machine 1. It differs in the following instances by eliminating the restrictions on the processable videotex applications.

When the user of the facsimile machine 1' is present and has switched 30 the facsimile machine 1' into the manual response mode, and if the incoming call is non-telephonic and if the user has lifted the handset from the telephone set 7 and initiated the handshake (start 31) and the 1,300 Hz frequency has been detected, then the processor 10 will keep the switch 20 in its operative position to retain the link between the line 8 and the modem 18 so that the facsimile machine 1' may proceed in the videotex mode and obviously in all combined videotex modes.

Figure 3:
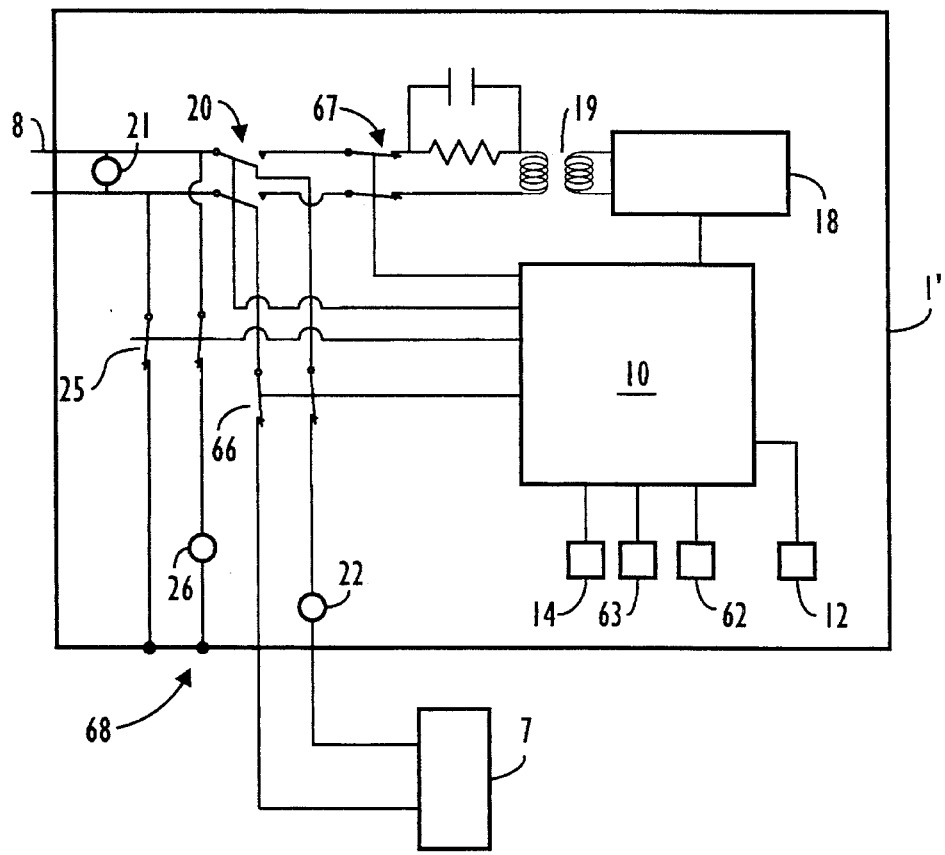
FIG. 3 is a block circuit diagram of a second embodiment of the facsimile machine with integrated fax and videotex functions and connected to a line of the STN network.
Figure 4:
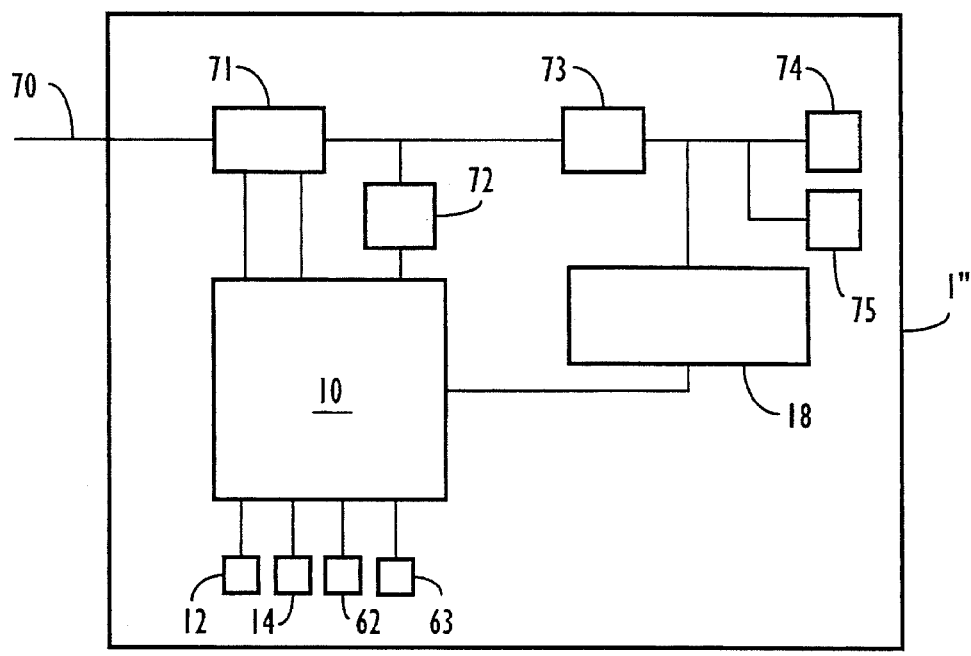
FIG. 4 is a block circuit diagram of a third embodiment of the facsimile machine with integrated fax and videotex functions and linked to a line of the ISDN network.

If the incoming call is non-voice and the user has lifted 39 the handset from an extension omitted from FIG. 3 and the 1,300 Hz frequency was recognized, then, again in this instance, the facsimile machine 1' may proceed in the videotex mode for all combined applications, as it may in fact in all other cases of the absent user for which he switched the facsimile machine 1' into the automated response mode and for which the 1,300 Hz frequency was recognized.

Besides the functions which the facsimile machine 1 may assume, the facsimile machine 1' may further assume that of a fax editor. By means of the processor 10 and keyboard 63 and screen 62, the user may pick up a message which then is stored before being converted into picture elements (pixels) and transmitted to a correspondent user of another facsimile machine. In this application the facsimile machine is used as a word processor. Contrary to the operation of the facsimile machine 1, it is possible with the facsimile machine 1' to carry out an interactive dialogue with a videotex server following command from the videotex server and implementation by the facsimile machine of teleprinting.

Presently the case of a recording answering machine integrated into the facsimile machine 1' will be considered. It only differs from the previous case in that the branches issuing from stages 43 and 52 (FIG. 2) are merged.

In summary, the facsimile machine 1' with integrated videotex terminal and linked to a telephone line of the STN network ensures the following operations:

1 Group G3 fax
2 conventional videotex operation
3 conventional integrated telephone operation, amplified or "freehand"
4 recording-answering by integrated recording-answering machine
5 videotex screen copy
6 paper or type M12 telematic recording-answering
7 teleprinting
8 management of telephone extension
9 management of an external recording-answering machine
10 management of a directory of abbreviated numbers which is common to faxing, videotex operation and telephone mode
11 logging a common journal of outgoing calls,
12 facsimile record
13 discrimination on incoming calls.

As regards the facsimile machine 1 with the videotex terminal being only associated, it assumes the functions 1, 3, 4, 6 (paper), 8 and 9, in identical manner, and the functions 2, 5, 7 and 13 in the same manner, whereas it cannot implement the functions 6 (M12), 10, 11, 12.

Next another multifunctional facsimile machine 1" shall be described, which also comprises a multifunctional modem and an integrated videotex terminal, but which is linked to a transmission line 70 of the ISDN network.

Furthermore the facsimile machine 1" comprises a processor 10, a multifunctional modem 18, a scanner 12, a printer 14, a screen 62 and a keyboard 63. Again it comprises a network interface 71 linked to a coder-decoder (codec) 73 to which are connected the modem 18, a digital recording answering machine 72 at the output of the interface 71, a loudspeaker 74 and a microphone 75.

Two 64 kb/s data channels B and a 16 kb/s signaling channel D can be transmitted over the ISDN line. The processor 10 controls the ISDN access by means of channel D protocols, namely the communication in channel B in the transparent mode TBCS (transparent B channel circuit switching) up to 64 kb/s using a G4 fax stack of protocols or high speed videotex protocols, and the communication in the B channel in the non-transparent mode (NTBCS) through the codec 73 and the modem 18 using G3 fax protocols or low speed videotex protocols. Also, the processor 10 controls the ISDN telephone and digital recording answering machine functions and the ISDN telephone and videotex applications.

The facsimile machine 1" ensures the following functions:

1 G3 fax in the NTBCS mode and G4 in the TBCS mode
2 low speed videotex operation in the NTBCS mode and high speed in the TBCS mode
3-7 functions 3-7 are assumed by the facsimile machine 1'
8 the extension undertakes a conventional transfer with the ISDN network
9 in this instance there is no significance in managing an external recording answering machine
10-12 the functions 10-12 are assumed by the facsimile machine 1'
13 discrimination between incoming calls as with STN network; also, the TBCS incoming calls are easily discriminated thanks to the ISDN signaling, with the BC (bearer capability) signal
14 logging and printing incoming calls, with caller numbers and any mini-messages USS (user to user signaling).

I claim:

1. A facsimile machine comprising:

a processor, a modem, at least one main telephone set, connecting means for connecting said at least one main telephone set and said modem to a data transmission line, a module for recognizing the type of incoming calls, and a printer, characterized in that:

said modem is a combined facsimile and videotex modem, and in that detection means are provided so that, when the videotex modem portion of said modem is linked to the data transmission line, events on the data transmission line are detected and their nature is recognized such that the data transmission line is routed to the facsimile modem portion of said modem or the videotex modem portion of said modem as a function of the nature of the events on the data transmission line, said facsimile machine further comprising:

direct connecting means for connecting said facsimile machine to at least one non-videotex terminal; and means for linking the non-videotex terminal to the data transmission line, wherein said data transmission line comprises one of the two networks ISDN and STN, and wherein said detection means selectively routes the data transmission line to said facsimile machine or the non-videotex terminal when the non-videotex terminal is linked to the data transmission line, and wherein a telephone extension set is branched in parallel from the data transmission line, and said facsimile machine further comprises:

means for detecting the event of an incoming call and the handset being lifted off said telephone extension set, and for switching the facsimile machine into a parallel intrusion mode for listening to the signals of said telephone extension set and recognizing the nature of the signals.

* * * * *